United States Patent
Vikberg et al.

(10) Patent No.: US 8,072,934 B2
(45) Date of Patent: Dec. 6, 2011

(54) METHOD AND NODE OF CONTROLLING THE ALLOCATION OF TRANSMISSION RESOURCES TO WIRELESS TERMINALS WITHIN A RADIO ACCESS NETWORK

(75) Inventors: Jari Vikberg, Järna (SE); Tomas Nylander, Värmdö (SE); Peter Öhman, Enebyberg (SE)

(73) Assignee: Telefonaktiebolaget L M Ericsson (publ), Stockholm (SE)

( * ) Notice: Subject to any disclaimer, the term of this patent is extended or adjusted under 35 U.S.C. 154(b) by 1057 days.

(21) Appl. No.: 11/721,223

(22) PCT Filed: Dec. 8, 2004

(86) PCT No.: PCT/EP2004/053333
§ 371 (c)(1),
(2), (4) Date: Jul. 10, 2007

(87) PCT Pub. No.: WO2006/061048
PCT Pub. Date: Jun. 15, 2006

(65) Prior Publication Data
US 2009/0109903 A1    Apr. 30, 2009

(51) Int. Cl.
*H04W 4/00* (2009.01)
(52) U.S. Cl. ........ 370/331; 370/329; 370/431; 455/436; 455/450
(58) Field of Classification Search .................. 455/450, 455/452.2, 456.1, 456.6, 509, 436, 437, 438, 455/451, 452.1, 456.2; 370/341, 329, 331, 370/431
See application file for complete search history.

(56) References Cited

U.S. PATENT DOCUMENTS

| | | | | |
|---|---|---|---|---|
| 6,721,565 B1 * | 4/2004 | Ejzak et al. | | 455/436 |
| 6,816,500 B1 * | 11/2004 | Mannette et al. | | 370/431 |
| 6,955,918 B2 * | 10/2005 | Haumont et al. | | 455/436 |
| 7,002,987 B2 * | 2/2006 | Shaughnessy et al. | | 370/466 |
| 7,027,417 B1 * | 4/2006 | Verkama et al. | | 370/329 |
| 7,054,302 B2 * | 5/2006 | Albal et al. | | 370/347 |
| 7,308,263 B2 * | 12/2007 | Gallagher et al. | | 455/439 |
| 7,346,032 B2 * | 3/2008 | Holcman et al. | | 370/331 |
| 7,359,347 B2 * | 4/2008 | Ahmavaara et al. | | 370/328 |
| 7,366,514 B2 * | 4/2008 | Ejzak | | 455/436 |
| 7,457,265 B2 * | 11/2008 | Julka et al. | | 370/331 |
| 7,502,345 B2 * | 3/2009 | Aaltonen | | 370/331 |
| 7,502,615 B2 * | 3/2009 | Wilhoite et al. | | 455/442 |
| 7,565,144 B2 * | 7/2009 | Saifullah et al. | | 455/436 |
| 7,600,009 B2 * | 10/2009 | Soininen et al. | | 709/223 |
| 7,634,269 B2 * | 12/2009 | Gallagher | | 455/436 |

FOREIGN PATENT DOCUMENTS
EP    1 182 900 A    2/2002
* cited by examiner

*Primary Examiner* — Kent Chang
*Assistant Examiner* — Magdi Elhag
(74) *Attorney, Agent, or Firm* — Roger S. Burleigh

(57) ABSTRACT

A method of controlling the allocation of transmission resources to wireless terminals within a radio access network, which resources are required for the provision of an IP Multimedia service to the terminals. The method comprises, in the event of a requirement to change the allocation of transmission resources to a given wireless terminal, sending a resource allocation request from a control node of the IP Multimedia Subsystem to the radio access network, the request causing a resource control node of the radio access network to change the allocation of access network resources to the wireless terminal.

26 Claims, 3 Drawing Sheets

METHOD AND NODE OF CONTROLLING THE ALLOCATION OF TRANSMISSION RESOURCES TO WIRELESS TERMINALS WITHIN A RADIO ACCESS NETWORK

FIELD OF THE INVENTION

The present invention relates to mobility provisions associated with an IP multimedia service. In particular, though not necessarily, the invention relates to a method and apparatus for enabling an IP Multimedia Subsystem to control the allocation of resources within a radio access network. The invention also relates to the provisioning of resources for IP Multimedia services.

BACKGROUND OF THE INVENTION

IP Multimedia (IPMM) services provide a dynamic combination of voice, video, messaging, data, etc. within the same session. By growing the numbers of basic applications and the media which it is possible to combine, the number of services offered to the end users will grow, and the interpersonal communication experience will be enriched. This will lead to a new generation of personalised, rich multimedia communication services, including so-called "combinational IP Multimedia" services which are considered in more detail below.

IP Multimedia Subsystem (IMS) is the technology defined by the Third Generation Partnership Project (3GPP) to provide IP Multimedia services over mobile communication networks (3GPP TS 23.228 and TS 24.229 Release 5 and Release 6). IMS provides key features to enrich the end-user person-to-person communication experience through the integration and interaction of services. IMS allows new rich person-to-person (client-to-client) as well as person-to-content (client-to-server) communications over an IP-based network. The IMS makes use of the Session Initiation Protocol (SIP) to set up and control calls or sessions between user terminals (or user terminals and web servers). The Session Description Protocol (SDP), carried by SIP signalling, is used to describe and negotiate the media components of the session. Others protocols are used for media transmission and control, such as Real-time Transport Protocol and Real-time Transport Control Protocol (RTP/RTCP), Message Session Relay Protocol (MSRP), Hyper Text Transfer Protocol (HTTP). IMS requires an access network which would typically be a 2G/3G General Packet Radio Service (GPRS)/Packet Switched (PS) network, but which might be some other access network such as fixed broadband or WIFI. FIG. 1 illustrates schematically how the IMS fits into the mobile network architecture in the case of a GPRS/PS access network.

SUMMARY OF THE INVENTION

A fundamental requirement for realtime service provision is the seamless handover of services for subscribers roaming across network cell boundaries. Traditional CS-based call services have been designed to meet this requirement. However, handover procedures in the PS domain are not so well established. Thus, the provision of IMS services such as voice and video calls utilising the PS domain is likely to result in users received a reduced quality of service. A solution to this problem is to allow the IMS to borrow resources from the CS domain for, for example, the transport of voice data. The voice data will then benefit from the seamless handover afforded by the CS domain.

In cases where an IP multimedia service is to be facilitated in the PS domain (i.e. without the borrowing of CS resources), it is desirable to allow the IMS to control or at least influence the allocation of PS resources within the radio access network. This is important because it is the IMS which has knowledge of the services to be provided and the resources which are needed to fully support these services.

Considering a 2G access network such as GSM, it is the role of the Base Station Controller (BSC) to allocate time slots within each transmission frame to particular subscribers and for particular services, i.e. CS and PS. This presents a difficulty, as the currently proposed network architectures do not allow for control to be transferred to the IMS.

According to a first aspect of the present invention there is provided a method of controlling the allocation of transmission resources to wireless terminals within a radio access network, which resources are required for the provision of an IP Multimedia service to the terminals, the method comprising, in the event of a requirement to change the allocation of transmission resources to a given wireless terminal, sending a resource allocation request from a control node of the IP Multimedia Subsystem to the radio access network, the request causing a resource control node of the radio access network to change the allocation of access network resources to the wireless terminal.

The present invention effectively allows the IP Multimedia Subsystem (IMS) to override or control the basic resource allocation procedure implemented by the resource control node.

The invention is applicable in particular to access networks which provide access both in the Circuit Switched (CS) and the Packet Switched (PS) domains. Said resource allocation request which is sent to the resource control node causes a change in the allocation of CS resources. More particularly, the request may cause the setting up or termination of a CS connection between the wireless terminal and the IMS.

The sending of the resource allocation request to the resource control node may be triggered by the receipt of a session setup request at the IMS. Where the IMS uses the Session Initiation Protocol (SIP), this request may be SIP INVITE message.

Preferably, the session setup request contains a means for identifying the current location of the wireless terminal. Where the access network is a GSM network, this means may be a Cell Global Identity.

Where the access network is a GSM network, the resource control node is a Base Station Controller. In certain embodiments, said resource allocation request may be sent to a Mobile Switching Centre which in response instruct the Base Station Controller to change the allocation of access network resources to the wireless terminal.

Preferably, said resource allocation request is carried by a simulated handover request. In the case of a GSM access network, this may be an inter-MSC handover request sent from the IMS to the MSC with which the wireless terminal is registered.

In an alternative embodiment, the resource allocation request is sent from the IMS to the resource control node over an Operations and Maintenance interface, or over a dedicated control interface.

According to a second aspect of the present invention there is provided an IP multimedia subsystem node arranged to facilitate the setting up and control of IP multimedia calls, the node comprising means for sending a resource allocation request from a control node of the IP Multimedia Subsystem to the radio access network in the event of a requirement to change the allocation of transmission resources to a given wireless terminal, the request causing a resource control node of the radio access network to change the allocation of access network resources to the wireless terminal.

DETAILED DESCRIPTION OF CERTAIN EMBODIMENTS

Figure 1:
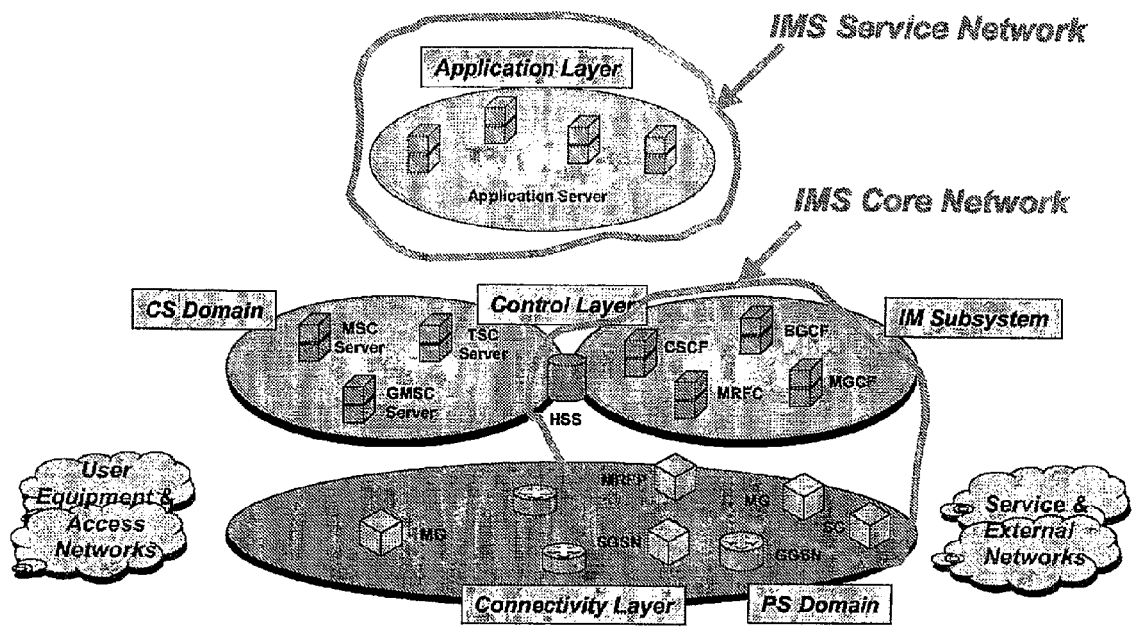
FIG. 1 illustrates schematically the IMS architecture within a 3G network.
Figure 2:
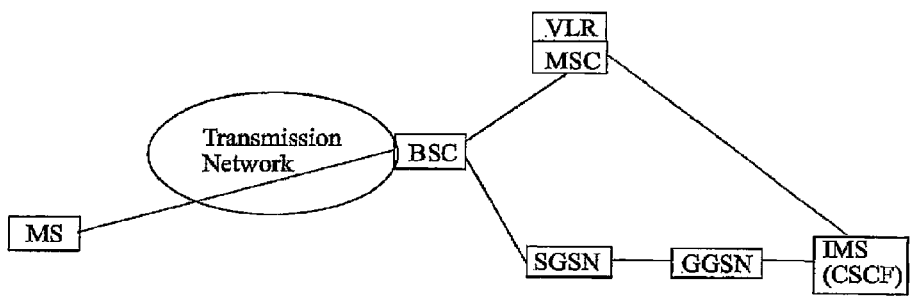
FIG. 2 illustrates schematically various network nodes involved in the provision of an IMS service.

With reference to FIG. 2, there are illustrated a number of network nodes which are involved in the provision of an IP Multimedia Subsystem (IMS) service to subscribers possessing mobile wireless terminals (or Mobile Stations, MS). Subscribers make use of a radio access network or "Transmission Network" which in this example is considered to be a 2G, GSM network which allocates transmission bandwidth to subscribers based upon Time Division Multiplex Access (TDMA). That is to say that, on a given carrier frequency, subscribers are allocated one or more timeslots within each of successive time frames based upon individual subscriber need as well as overall demand. Conventionally, a base station controller (BSC) within the transmission network will allocate a fixed number of slots (typically one) per time frame for a circuit switched (CS) voice call, and one or more slots per time frame for a packet switched (PS) data call, i.e. a GPRS session.

The BSC communicates with a Mobile Switching Centre (MSC) with associated Visitor Location Register (VLR). The MSC is responsible for maintaining information identifying the current location of subscribers within the operator's network. For this purpose, the MSC/VLR uses a Location Area Identifier (LAI) element which identifies the Location Area to which the MS is currently registered. The MSC can also use a Cell Global Identifier (CGI) to identify a BSC and a cell belonging to the BSC. The CGI consists of LAI and Cell identity.

Within the GPRS core network, packet switched services are facilitated by a Serving GPRS Support Node (SGSN) and a Gateway GPRS Support Node (GGSN). The GGSN is coupled to the IMS core network, and in particular to a Call Server Control Function (CSCF) node. This will typically be a Serving CSCF (S-CSCF) node. In order to access the IMS, the MS must first register with the IMS using the Session Initiation Protocol (SIP) REGISTER message. To establish and control an IMS service, the MS exchanges further SIP messages with the S-CSCF. The SIP messages are transported via a physical GPRS transport channel.

This proposal addresses the problem of ensuring that sufficient access network resources are allocated to a SIP service so as to properly support that service. Traditionally, SIP services would be supported by a sufficient allocation of PS timeslots over the access network. However, where the access network is a 2G network such as GSM, there is no convenient mechanism for allowing a smooth handover in the PS domain when a MS roams across a cell boundary. The approach described here allows the IMS to effectively borrow resources from the CS domain to satisfy a need for voice transport. Handover in the CS domain is well provided for. This approach allows new IMS based services to co-exist with legacy type access networks.

Figure 3:
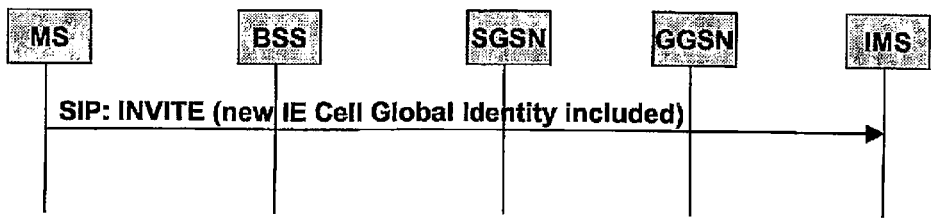
FIG. 3 illustrates signalling associated with the provision of a Cell Global Identity from a wireless terminal to the IMS.

In order to allow the IMS to control or otherwise influence the allocation of resources in the CS domain, the IMS must first know the current location of the subscriber. This is facilitated by the MS sending a notification containing the CGI to the IMS. The CGI is known to the radio resource management layer (RR in GSM). The upper layers (e.g. SIP) at the MS can retrieve the CGI. This may require the provision of a new interface or application programming interface (API) between the upper layers and the RR layer. As part of an IMS session establishment, the MS sends the current CGI (i.e. the CGI of the cell in which the MS is currently "camped") to the S-CSCF as for example a new information element in the SIP INVITE or REGISTER message. The use of the INVITE message is preferable as the current cell may change between initial SIP registration and the sending of a request for an IMS service. The use of the INVITE message for this purpose is illustrated in FIG. 3.

At this point, the PS call between the MS and a peer MS has been established. Once the IMS has been notified of the CGI in the SIP INVITE message, the process of controlling the allocation of time slots utilises a handover procedure to establish a CS call for the MS, and to handover the call from the PS domain to the CS domain.

This approach requires that the IMS implements standard handover functionality for a GSM handover. The S-CSCF within the IMS acts as an anchor MSC and generates information which would usually be initiated by a BSC, i.e. the information which a BSC would include in a handover-required message sent to an MSC in order to trigger a handover at the MSC. This approach causes the target BSC to allocate CS time slots to the MS on the basis of the information contained in the handover-required message.

Consider the example of a voice call established using a SIP INVITE sent from the MS to the IMS. The SIP invite contains the CGI as described above. The S-CSCF looks up a mapping table which maps LAIs to MSCs in order to identify the MSC which is currently responsible for the MS. The S-CSCF then sends a "MAP-Prepare HO" message (including the CGI) to the target MSC, which reacts by sending a HANDOVER REQUEST message to the target BSC. The BSC then allocates a CS timeslot within the cell to the MS, and a handover reference is returned to the MSC in a HANDOVER REQUEST-ACK message. The handover command information is then sent back to the S-CSCF in a MAP -PREPARE-HANDOVER-RESPONSE message. The S-CSCF initiates a CS connection to the MSC by exchanging ISUP IAM and ACM messages with the MSC. At the same time, the S-CSCF notifies the MS of the handover command information in a SIP 2000K message. When the MS receives this information in the SIP-application layer, the RR layer in the MS is requested to activate and perform the standard procedure to tune to the new timeslot. Once the MS is in contact with the base station of the transmission network, a voice channel is activated from the BSC via the MSC to the IMS.

Figure 4:
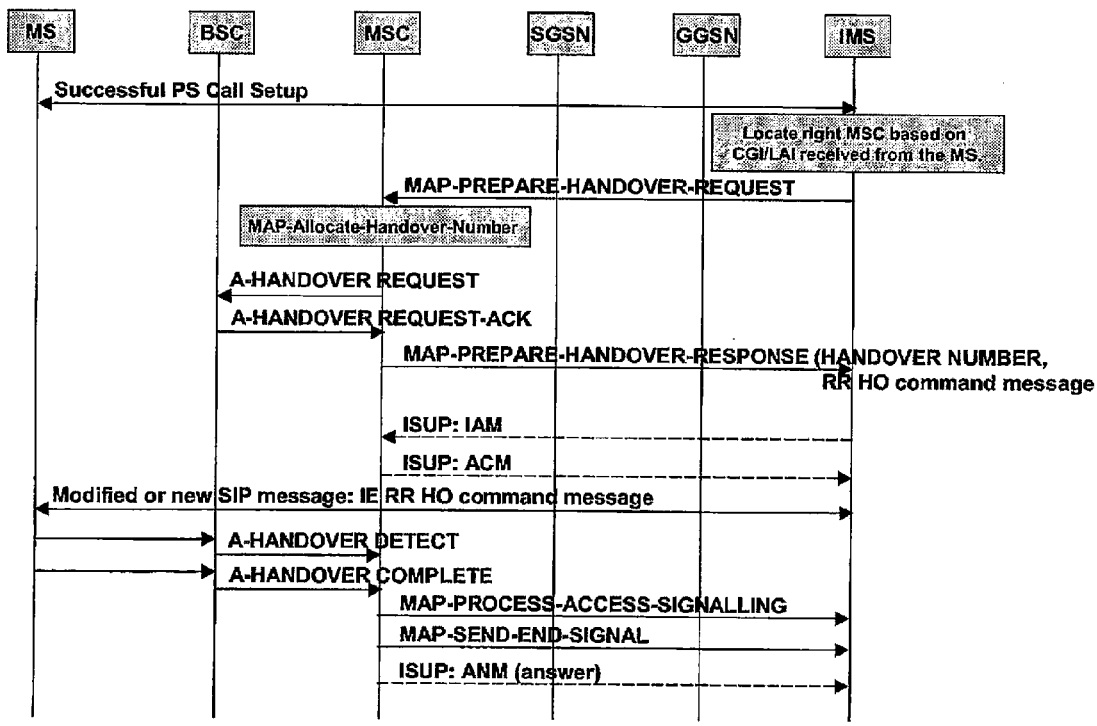
FIG. 4 is a signalling diagram illustrating signalling associated with the re-allocation of access network resources based upon an inter-MSC handover.

FIG. 4 illustrates the signalling associated with this procedure.

Following completion of the 'Inter-MSC Handover', the call may continue according to one of the two following options:

1. Only user plane data for the call is transported using the CS domain, whilst the GSM PS side continues to transport the signalling plane data. The Call context is kept at the SIP-layer in the MS.
2. Both signalling plane and user plane data for the call are moved to the CS domain and GSM PS side on the radio transmission level in the MS is deactivated. The CS signalling channel is used to transparently carry the SIP messages between the MS and the IMS system. The Call context is kept at the SIP-layer in the MS.

Figure 5:
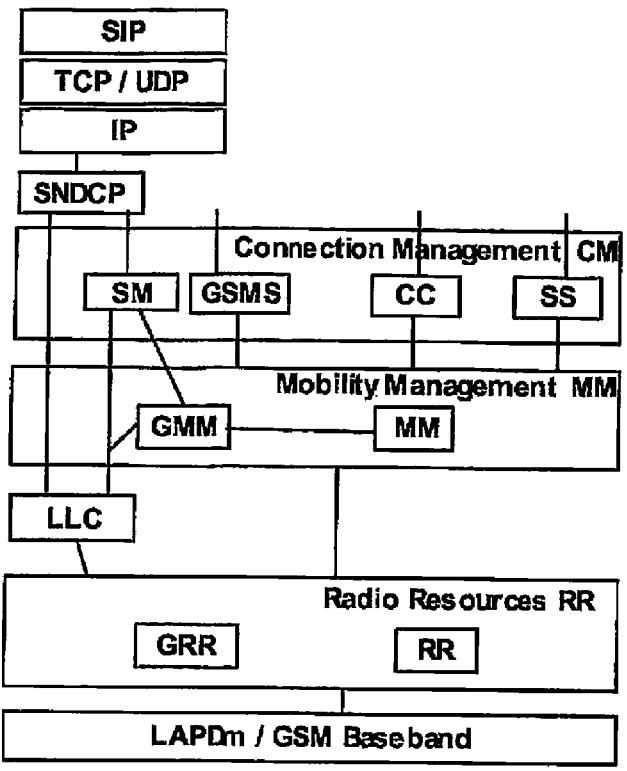
FIG. 5 illustrates the protocol architecture of a Class A or B mobile station.

Considering firstly option 1, the call is originally established over the PS domain using GPRS as the radio bearer. The MS must possess Class A capabilities (i.e. capable for both CS and PS simultaneously). The protocol architecture (according to 3GPP TS 24.007) for Class A or B MSs supporting GPRS is illustrated in FIG. 5. The GSM RR-layer is activated in the MS, but the upper layers in the MS (i.e. Call Control (CC), Mobility Management (MM) etc. that are part of Connection Management (CM) layer) are not activated for this call.

The voice part of the SIP call in the MS is connected to the traffic channel established at the RR-layer as a result of the handover procedure. The SIP-layer in the MS provides the necessary information to the RR layer using a new API, and as a result the RR layer connects the traffic channel to the microphone and speaker within the MS. (Alternatively, the SIP layer can perform this action, informing the RR layer of the result.) The RR layer also takes care of the procedures (i.e. listening to system information, measurement reporting to the network, etc.) required for further handovers in the GSM CS domain due for example to a MS moving between cells.

The signalling processes within the MS continue to use the GSM PS path. In the case of MS roaming between cells, it is noted that the handover for the GSM PS domain is not that effective. However, application (or transmission) level retransmissions will adequately handle the possibly of lost or delayed signalling messages during subsequent handovers for the call. In this case the normal procedures for GSM CS handover and PS cell update/Routing Area Update (RAU) can be used. The CS handover is fast enough, but the PS Cell update/RAU will take more time.

Considering now option 2, the user plane is handled in exactly the same way as in option 1. Furthermore, the SIP signalling entity in the MS is connected either directly to the RR-layer or to the MM-layer. These both provide the possibility to send transparent DTAP-messages between the MS and the anchor-MSC, i.e. the IMS, which can be used to carry the SIP-signalling messages.

If the SIP-signalling entity is connected to the RR-layer, the RR-layer knows that the MM-layer is not used in this special case and so all downlink DTAP-messages are passed to the SIP-signalling entity. Furthermore, the RR-layer accepts uplink DTAP-messages only from SIP-signalling entity. This can also be implemented by using a software switch between the RR and MM layers that knows if the downlink messages are to be passed to the SIP-signalling entity or to the MM-layer. Preferably, the Protocol Discriminator for GSM CC is used for the messages carrying SIP-control messages.

The alternative approach of connecting the SIP-signalling entity to the MM-layer is more complicated, as the MM-layer would need to be altered. The MM-layer needs to know that no messages should be accepted from the GSM CC. Instead, messages from the SIP-signalling entity are accepted in the uplink direction. In the downlink direction, the MM-layer forwards messages to the SIP-signalling entity instead of the GSM CC layer. Preferably, the Protocol Discriminator for GSM CC (Call Control) is used for the messages carrying SIP-control messages.

The above procedure assumes that a PS call is established prior to the handover occurring. However, it is also possible to establish the CS call prior to establishment of the PS call, i.e. prior to the peer MS responding to the SIP INVITE. In this case, the IMS responds immediately upon receipt of the SIP INVITE by establishing the CS call to the initiating MS. This solution is however not optimal in terms of the usage of network resources as the CS call may be established even when the call is not answered by the peer MS.

Figure 6:
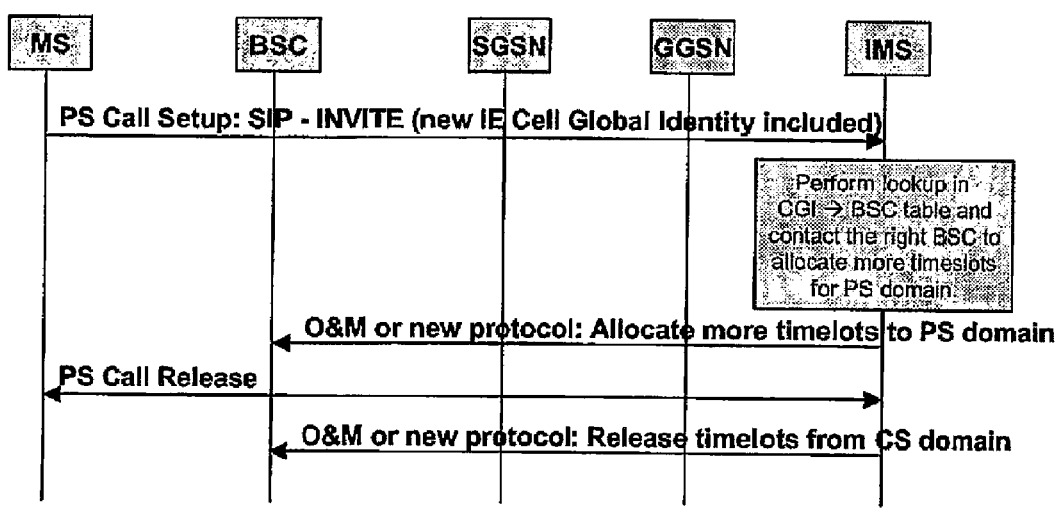
FIG. 6 is a signalling diagram illustrating signalling associated with the re-allocation of access network resources based upon a re-allocation command sent to a BSC.

An alternative, though perhaps less advantageous approach to controlling the allocation of radio access network resources involves direct control of the BSC by the IMS. When a voice call is initiated by an MS using the PS domain, and the IMS notified of the CGI by the MS, the S-CSCF looks up a mapping table using the CGI to find the correct BSC. The S-CSCF then contacts the identified BSC either via the normal Operation and Maintenance (O&M) interface, i.e. the S-CSCF acts as an element manager and issues commands to increase the number of timeslots that the BSC allocates to the MS for PS services. The S-CSCF knows the voice codec to be used for the call and so can instruct an allocation of timeslots based on this information. When the need for the additional PS timeslots ceases, the IMS instructs the BSC to release the allocated timeslots. The signalling sequence associated with this procedure is illustrated in FIG. 6.

As an alternative to utilising the O&M interface to control the BSC, a new, dedicated interface/protocol between the IMS and the BSC could be developed to control this type of functionality.

Whilst this approach does indeed allow the IMS to control the allocation of PS resources within the access network, thereby ensuring that adequate resources are available for a requested service, it does not directly address the problem of mobility, as calls are still provided in the PS domain for which mobility procedures are not well established.

It will be appreciated by the person of skill in the art that various modifications may be made to the above described embodiments without departing from the scope of the present invention. For example, whilst the above embodiments have been described with reference to a TDMA access networks the invention is also applicable to other types of access networks including, but not limited to, WCDMA networks.

The invention claimed is:

1. A method of controlling the allocation of transmission resources to wireless terminals within a radio access network, which resources are required for the provision of an IP Multimedia service to the terminals, the method comprising:
   in the event of a requirement to change the allocation of transmission resources to a given wireless terminal, sending the current location of the terminal within the radio access network from the terminal to an IP Multimedia Subsystem: and
   sending a resource allocation request from a control node of the IP Multimedia Subsystem to a destination node within the radio access network identified using said location, the request causing a resource control node of the radio access network to change the allocation of access network resources to the wireless terminal.

2. A method according to claim 1, wherein the radio access network provides access both in the Circuit Switched and the Packet Switched domains.

3. A method according to claim 2, wherein said request results in the setting up or termination of a Circuit Switched call between the wireless terminal and the IP Multimedia Subsystem.

4. A method according claim 1, wherein the sending of the resource allocation request to the resource control node is triggered by the receipt of a session setup request at the IP Multimedia Subsystem.

5. A method according to claim 4, wherein the IP Multimedia Subsystem uses the Session Initiation Protocol and said session setup request is a Session Initiation Protocol INVITE message.

6. A method according to claim 4 or 5, wherein the session setup request contains a means for identifying the current location of the wireless terminal.

7. A method according to claim 6, wherein the access network is a GSM network, and said means is a Cell Global Identity.

8. A method according claim 1, wherein the access network is a GSM network and the resource control node is a Base Station Controller.

9. A method according to claim 8, wherein said resource allocation request is sent to a Mobile Switching Center which in response instructs the Base Station Controller to change the allocation of access network resources to the wireless terminal.

10. A method according claim 1, wherein said resource allocation request is carried by a simulated handover request.

11. A method according to claim 10, wherein the access network is a GSM network and said handover request is an inter-MSC handover request sent from the IP multimedia subsystem to the MSC with which the wireless terminal is registered.

12. A method according to claim 3 and comprising sending the resource allocation request following the establishment of a call in the packet switched domain, the request initiating a handover of the packet switched call to a circuit switched call.

13. A method according to claim 1, wherein the resource allocation request is sent from the IP multimedia subsystem to the resource control node over an Operations and Maintenance interface, or over a dedicated control interface.

14. An IP multimedia subsystem node arranged to facilitate the setting up and control of IP multimedia calls, the node comprising:
   means for receiving the current location of a terminal within the radio access network from the terminal; and
   means for identifying a destination node within the radio access network using said location and for sending a resource allocation request from a control node of the IP Multimedia Subsystem to said destination node in the event of a requirement to change the allocation of transmission resources to a given wireless terminal, the request causing a resource control node of the radio access network to change the allocation of access network resources to the wireless terminal.

15. The node according to claim 14, wherein the radio access network provides access both in the Circuit Switched and the Packet Switched domains.

16. The node according to claim 15, wherein said request results in the setting up or termination of a Circuit Switched call between the wireless terminal and the IP Multimedia Subsystem.

17. The node according to claim 14, wherein the sending of the resource allocation request to the resource control node is triggered by the receipt of a session setup request at the IP Multimedia Subsystem.

18. The node according to claim 17, wherein the IP Multimedia Subsystem uses the Session Initiation Protocol and said session setup request is a Session Initiation Protocol INVITE message.

19. The node according to claim 17 or 18, wherein the session setup request contains a means for identifying the current location of the wireless terminal.

20. The node according to claim 19, wherein the access network is a GSM network, and said means is a Cell Global Identity.

21. The node according to claim 14, wherein the access network is a GSM network and the resource control node is a Base Station Controller.

22. The node according to claim 21, wherein said resource allocation request is sent to a Mobile Switching Center which in response instructs the Base Station Controller to change the allocation of access network resources to the wireless terminal.

23. The node according to claim 14, wherein said resource allocation request is carried by a simulated handover request.

24. The node according to claim 23, wherein the access network is a GSM network and said handover request is an inter-MSC handover request sent from the IP multimedia subsystem to the MSC with which the wireless terminal is registered.

25. The node according to claim 16, further comprising means for sending the resource allocation request following the establishment of a call in the packet switched domain, the request initiating a handover of the packet switched call to a circuit switched call.

26. The node according to claim 14, wherein the resource allocation request is sent from the IP multimedia subsystem to the resource control node over an Operations and Maintenance interface, or over a dedicated control interface.

* * * * *

UNITED STATES PATENT AND TRADEMARK OFFICE
CERTIFICATE OF CORRECTION

| | | |
|---|---|---|
| PATENT NO. | : 8,072,934 B2 | Page 1 of 1 |
| APPLICATION NO. | : 11/721223 | |
| DATED | : December 6, 2011 | |
| INVENTOR(S) | : Vikberg et al. | |

It is certified that error appears in the above-identified patent and that said Letters Patent is hereby corrected as shown below:

In Column 1, Line 49, delete "WIFI." and insert -- WiFi. --, therefor.

In Column 4, Line 57, delete "2000K" and insert -- 200OK --, therefor.

In Column 5, Lines 36-42, delete "GSM PS domain.......... will take more time." and insert the same at Line 35, after "for the", as continuation of the paragraph.

In Column 6, Line 45, delete "networks" and insert -- network, --, therefor.

In Column 7, Line 5, in Claim 4, delete "according" and insert -- according to --, therefor.

In Column 7, Line 19, in Claim 8, delete "according" and insert -- according to --, therefor.

In Column 7, Line 27, in Claim 10, delete "according" and insert -- according to --, therefor.

Signed and Sealed this
Twenty-ninth Day of May, 2012

David J. Kappos
*Director of the United States Patent and Trademark Office*